Figure 1:
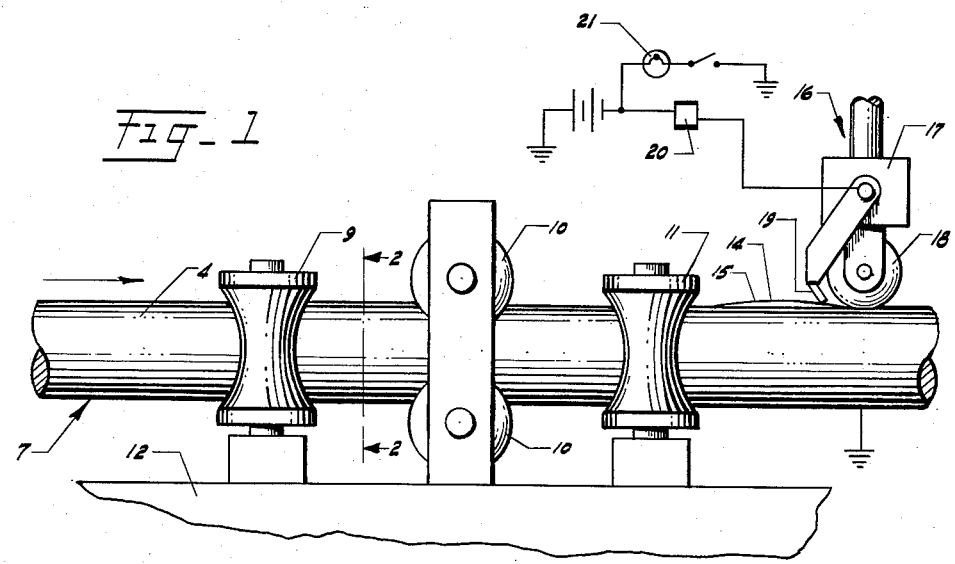

May 16, 1961  E. W. REYNOLDS  2,984,100
TESTING OF SEAMS IN CABLE SHEATHING
Filed Jan. 9, 1957

INVENTOR
E.W. REYNOLDS
BY
ATTORNEY

United States Patent Office 2,984,100
Patented May 16, 1961

2,984,100

TESTING OF SEAMS IN CABLE SHEATHING

Ellwood W. Reynolds, Watchung, N.J., assignor to Western Electric Company, Incorporated, New York, N.Y., a corporation of New York Filed Jan. 9, 1957, Ser. No. 633,360

2 Claims. (Cl. 73—88)

This invention relates to the manufacture of cables having metal sheathings such as, for example, metal sheathings with longitudinally extending soldered or welded seams as disclosed in Patent 2,589,700 to H. G. Johnstone, and particularly to the continuous testing and detection of defectively soldered or welded longitudinally extending seams in such sheathings.

In the fabrication of a sheathing of the aforementioned type on a power or telephone cable, a strip of sheet metal is formed around an advancing cable core and the edges of the formed sheet metal are soldered or welded together to hold the sheathing in its formed shape and to provide mechanical and moisture-proof protection for the cable core. The sheathed cable is wound on a take-up reel and is subsequently passed through an extruder which applies a plastic material such as polyethylene thereover and again is wound on a take-up reel. In normal handling then, the cable may be wound and unwound to and from reels several times, and each time the seam in the metal sheathing undergoes considerable mechanical working so that any defectively soldered portions may break apart. If such defects are not located and repaired before the plastic covering is extruded thereover, the sharp edges of such opened seams may work through the plastic coating and ruin the moisture seal of the sheathing and plastic covering, which could cause serious damage to the wires of the cable. Once the plastic coating has been applied, defects are difficult and expensive to repair, and may necessitate stripping the entire sheathing from the full length of the cable and applying a new sheathing thereover.

It is, therefore, the object of this invention to test the newly soldered or welded longitudinally extending seam in such sheathings and to locate such defects so that they may be conveniently repaired before the plastic coating is extruded thereover.

In accordance with the general features of the invention, a longitudinally or axially advancing sheathed cable is mechanically worked, simulating the stresses and strains the cable may be subjected to in normal use and service, in order to break apart any open or defectively soldered or welded portions of the seam, at least one of the edges of such portions being lifted out of the regular seam path as the cable is advanced along a given path so that such edges move into contact with and actuate a detecting mechanism normally spaced from and out of operative relation with the normal path of the seam. This method is equally effective on either butting or overlapping longitudinally extending seams.

In a preferred embodiment, pairs of opposed rolls, spaced along the path through which the cable is advanced, successively compress the cable in relatively perpendicular planes such that the cable seam will be vigorously mechanically worked and weak and defective portions of the seam will break open so that the edges thereof are raised from the normal seam path. A detector mechanism normally spaced apart from the worked seam path will make contact with and be actuated by such raised edges.

Figure 2:
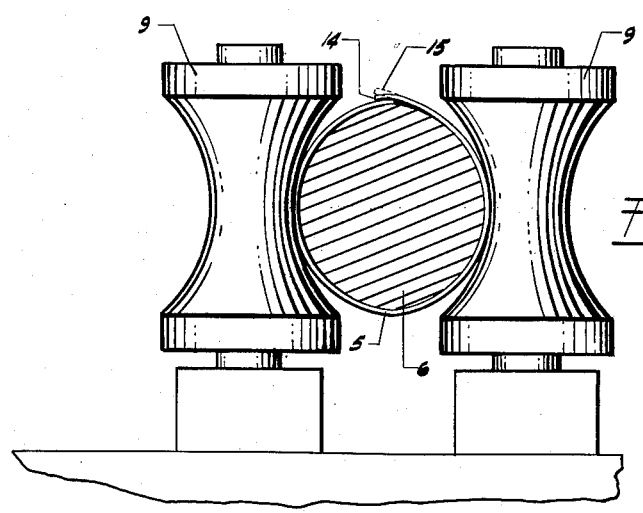

These and other features of the invention will be more fully understood from the following detailed description taken in conjunction with the accompanying drawing, in which:

Fig. 1 is a side elevational view of one form of apparatus for mechanically working cable sheathings and a mechanism for detecting seams opened thereby; and Fig. 2 is an enlarged view as seen along the plane of line 2—2 of Fig. 1.

The drawing discloses a preferred embodiment of the invention for testing the soldered overlap seam 4 in a transversely formed metal sheathing 5 around core 6 of a cable 7 being advanced in the direction of the arrow (Fig. 1) along a prescribed longitudinal path. This apparatus is preferably incorporated in the production line wherein the metal sheathing 5 is applied over the core 6 and it should be located at the output end of the seam soldering or welding apparatus so that in the event that a defective seam portion is detected, the cable may be stopped and repaired before it is wound on the take-up reel for the line. This detection and repair of such defective portions then is accomplished prior to the extrusion of the plastic coating thereover and substantially eliminates the possibility of such tested cables failing in the field.

The cable is passed between successive pairs of rolls 9, 10 and 11, which are supported on a fixed member 12 such that the cable is first compressed by the application of opposing horizontal compressive forces by the first pair of rolls 9, followed by the application of opposing vertical compressive forces by the compressing rolls 10, the upper roll of this pair acting directly on the seam 4 which in turn is followed by a second application of opposing horizontal forces by the rolls 11. These rolls 11 may be spaced apart such that they round out or restore the desired circular cross-section to the cable after it is flattened by the rolls 10. The rolls are all curved to conform to the general curvature of the cable being passed therebetween so that the sheathing 5 will not be permanently deformed except where there are defects. The seam 4, which in normal practice is located at the top of the cable core 6, is vigorously stressed by the application of the forces applied by the rolls so that any defectively soldered or open portions thereof, such as that designated 14, will be forced apart and the edge 15 will be raised from the normal seam path (as illustrated in phantom in Fig. 2) so that such portion may be detected. A detector mechanism 16, which may be of the type disclosed in the co-pending application of C. A. Hallam and T. F. Herron, Serial No. 635,371, filed January 22, 1957, may be utilized for this purpose. This detector comprises an externally supported member 17 having limited vertical freedom which holds a roller 18 in rolling engagement on the top of the cable 7 and also supports a sensing bar 19 in relative fixed relation such that the lower edge of member 17 is normally positioned above the normal seam path on which the roller 18 rides. The sensing bar 19 is insulated from the roller 18 and is conductively connected in the energizing circuit of an alarm control relay 20 so that whenever a raised edge 15 of a defective portion of the seam is lifted from the normal seam path, it engages the member 19 to complete the energizing circuit for the relay 20 through the normally grounded sheathing 5. The relay thereupon operates to set off an indicator or alarm 21 to signal the operator and enable him to stop the cable to repair the seam and also adjust the soldering mechanism if it is at fault.

While three pair of compressing rolls have been utilized in this embodiment to vigorously work the sheathing in the vicinity of the seam, a single pair of such rolls could also be utilized in the event that less vigorous mechanical working is required where, for example, the cable is not to be subjected to such severe service or use. Such a pair of rolls would be mounted for applying a compressive force horizontally as shown in Fig. 2 on opposite sides of the seam in order to break and spread apart defective seam portions.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A device for testing longitudinally extending seams in the metal sheathing of a cable being advanced axially along a predetermined path, which comprises a plurality of pairs of opposing rolls spaced along the path through which the cable is advanced for receiving and compressing the cable therebetween, successive pairs of rolls being disposed at substantially right angles to one another so as to squash the cable successively different directions substantially ninety degrees apart for continuously mechanically working such an advancing sheathing to subject the seam therein to predetermined stresses and strains to break open weak and defective portions thereof and lift the opened seam from the path through which the seam normally is advanced, and a detector at the cable exit end of the rolls having means for sensing such raised seam edges.

2. In a device according to claim 1 wherein the cable contacting surfaces of the rolls are curved to conform generally to the elliptical cross-section of the cable compressed therebetween, the pair of rolls adjacent the detector being so spaced from each other to compress the cable to restore its circular cross-section.

References Cited in the file of this patent

UNITED STATES PATENTS

| | | |
|---|---|---|
| 1,797,882 | Scott | Mar. 24, 1931 |
| 2,732,712 | Reed | Jan. 31, 1956 |